United States Patent
Recktenwald

(10) Patent No.: US 11,789,854 B2
(45) Date of Patent: Oct. 17, 2023

(54) HYBRID INTERFACE TESTING

(71) Applicants: VOLKSWAGEN AKTIENGESELLSCHAFT, Wolfsburg (DE); AUDI AG, Ingolstadt (DE); DR. ING. H.C. F. PORSCHE AKTIENGESELLSCHAFT, Stuttgart (DE)

(72) Inventor: Benedict A. Recktenwald, Sunnyvale, CA (US)

(73) Assignees: VOLKSWAGEN AKTIENGESELLSCHAFT, Wolfsberg (DE); AUDI AG, Ingolstadt (DE); DR. ING. H.C. F. PORSCHE AKTIENGESELLSCHAFT, Ingolstadt (DE)

( * ) Notice: Subject to any disclaimer, the term of this patent is extended or adjusted under 35 U.S.C. 154(b) by 394 days.

(21) Appl. No.: 16/996,880

(22) Filed: Aug. 18, 2020

(65) Prior Publication Data

US 2021/0056015 A1 Feb. 25, 2021

Related U.S. Application Data

(60) Provisional application No. 62/888,813, filed on Aug. 19, 2019.

(51) Int. Cl.
| | |
|---|---|
| *G06F 11/36* | (2006.01) |
| *G06N 3/04* | (2023.01) |
| *G07C 5/08* | (2006.01) |
| *G06N 3/08* | (2023.01) |
| *G06F 11/07* | (2006.01) |

(Continued)

(52) U.S. Cl.
CPC ........ *G06F 11/3688* (2013.01); *G06F 11/079* (2013.01); *G06F 11/3684* (2013.01); *G06N 3/04* (2013.01); *G06N 3/08* (2013.01); *G07C 5/0825* (2013.01); *G07C 2205/02* (2013.01); *H04N 5/77* (2013.01); *H04R 1/08* (2013.01)

(58) Field of Classification Search
CPC ............... G06F 11/3638; G06F 11/079; G06F 11/3684; G06N 3/04
See application file for complete search history.

(56) References Cited

U.S. PATENT DOCUMENTS

| | | | |
|---|---|---|---|
| 10,091,670 B2 * | 10/2018 | Gallagher | ............... H04W 4/46 |
| 10,536,865 B2 * | 1/2020 | Gallagher | ............. H04W 4/026 |
| 11,075,910 B2 * | 7/2021 | Dean | ................... H04L 63/0892 |

(Continued)

*Primary Examiner* — Kamini B Patel
(74) *Attorney, Agent, or Firm* — Shield Intellectual Property PC; Kirk D. Wong

(57) ABSTRACT

A user interface testing system, method, and device for a vehicle under test ("VUT"). A test system is communicatively coupled to the VUT. A test system records outputs of at least one human-machine-interface ("HMI") responsive to a first set of test cases and then scores the recorded HMI outputs responsive to the first set of test cases. The test system generates a second set of test cases and scoring criteria for the second set of test cases based on the received first set of test cases and the recorded HMI outputs responsive to the first set of test cases. The test system performs the second set of test cases on the HMI and records HMI outputs responsive to the second set of test cases. The test system assigns scores for the recorded HMI outputs responsive to the second set of test cases using the generated scoring criteria.

20 Claims, 11 Drawing Sheets

(51) Int. Cl.
*H04N 5/77* (2006.01)
*H04R 1/08* (2006.01)

(56) References Cited

U.S. PATENT DOCUMENTS

| | | |
|---|---|---|
| 2012/0226940 A1 | 9/2012 | Lin |
| 2014/0122026 A1* | 5/2014 | Aberg .................... G06F 30/20 |
| | | 703/1 |
| 2014/0122028 A1* | 5/2014 | Aberg .................. G06F 11/368 |
| | | 703/1 |
| 2014/0303756 A1* | 10/2014 | Tarnutzer ............ G06F 11/3688 |
| | | 700/83 |
| 2016/0366598 A1* | 12/2016 | Gallagher ............ H04W 52/367 |
| 2017/0069146 A1* | 3/2017 | Sun ...................... G07C 5/0808 |
| 2017/0367637 A1* | 12/2017 | Starodubtsev ....... A61B 5/0245 |
| 2018/0376354 A1* | 12/2018 | Gallagher ............... H04W 4/46 |
| 2019/0050322 A1* | 2/2019 | Bhojan .................. G06N 5/003 |
| 2019/0294530 A1* | 9/2019 | Dutta .................. G06F 11/3692 |
| 2020/0005094 A1* | 1/2020 | Sinha ..................... G06V 10/82 |
| 2022/0342681 A1* | 10/2022 | Li ........................ B60W 50/14 |

\* cited by examiner

HYBRID INTERFACE TESTING

CROSS REFERENCE

The present application claims priority to the U.S. Provisional Patent Application No. 62/888,813 filed on Aug. 19, 2019, the contents of which are hereby incorporated in its entirety.

FIELD

The present disclosure relates to systems, components, and methodologies related to user interfaces. More particularly, the present disclosure relates to systems, components, and methodologies related to development and testing of vehicle user interfaces.

BACKGROUND

The rapid rise of user interface operations in transportation vehicles can require extensive program development with highly dynamic evolution. Yet, testing such systems can itself present an arduous task. Moreover, the dynamic nature of the development process can further complicate the testing operations, which often must reflect the dynamics of the development process. Automated test systems can assist with the challenges of user interface testing but can lack the flexibility of conventional interface development.

SUMMARY

Disclosed embodiments may provide a user interface test system for performing hybrid testing of transportation vehicle user interfaces and components which may include an image capture system for collecting images of user interfaces of the transportation vehicle, and an interface for analyzing the operations of user interfaces of transportation vehicles.

In accordance with some disclosed embodiments, the user interface test system may be adapted to receive baseline evaluation criteria comprising (i) receiving indication of manual user inputs to a test subject user interface, and (ii) receiving and storing user scores of baselines outputs of the test subject user interface responsive to the manual user inputs.

In accordance with some disclosed embodiments, the user interface test system may be adapted to perform an automated portion of active evaluation including providing automated inputs to the test subject user interface (e.g., a human-machine interface(s) of a vehicle).

In accordance with disclosed embodiments, the user interface test system may be adapted to receiving responsive outputs from the test subject user interface, and comparing the outputs to the user scores of the baselines outputs.

In accordance with some disclosed embodiments, the user interface test system may be adapted to generate and display the evaluation output to the user, wherein the evaluation output includes identification of at least one human-machine interface ("HMI") screen anomaly and at least one request for clarification from the user based on the user scores of the baselines outputs.

In accordance with some disclosed embodiments, the request for clarification may include a request for user indication of whether one or more of the at least one HMI screen anomaly are acceptable.

In accordance with some disclosed embodiments, user indication of one or more of the at least one HMI screen anomaly as acceptable may include selecting an area of the at least one HMI interface screen to indicate acceptable area of deviation.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Development of user interfaces, whether referred to as user experience development or human-machine interface development, is of increasing value in highly computerized transportation vehicles. The rapid increase in functionality of vehicles available through the user interface has likewise increased the resources devoted to user interface development as an important aspect of transportation vehicle, whether traditionally human operated vehicle, semi-autonomous vehicles, fully autonomous vehicles, or combination thereof.

Yet, increasingly sophisticated user interfaces can require substantial complex testing and/or evaluation to ensure that operations are carried out successfully and accurately on a consistent basis. This testing can be highly time consuming during the development process. Moreover, an automated test system, which may have been traditionally employed to reduce manpower in performing the actual testing itself, can still require time-intensive development of the automated testing techniques. Furthermore, the increasingly dynamic development of the user interface can place intense pressure on fully automated systems both in the sense of the timeline to implementation of the user interface and the rapid changing of the user interface during development.

The devices, systems, and methods of the present disclosure provide a test system providing complimentary human (manual) and automated test operations as a hybrid manner of testing user interfaces. A hybrid operation can simplify the testing process for the test subject user interface, and can permit adaptability of the testing operations to the development process of the user interface.

Figure 1A:
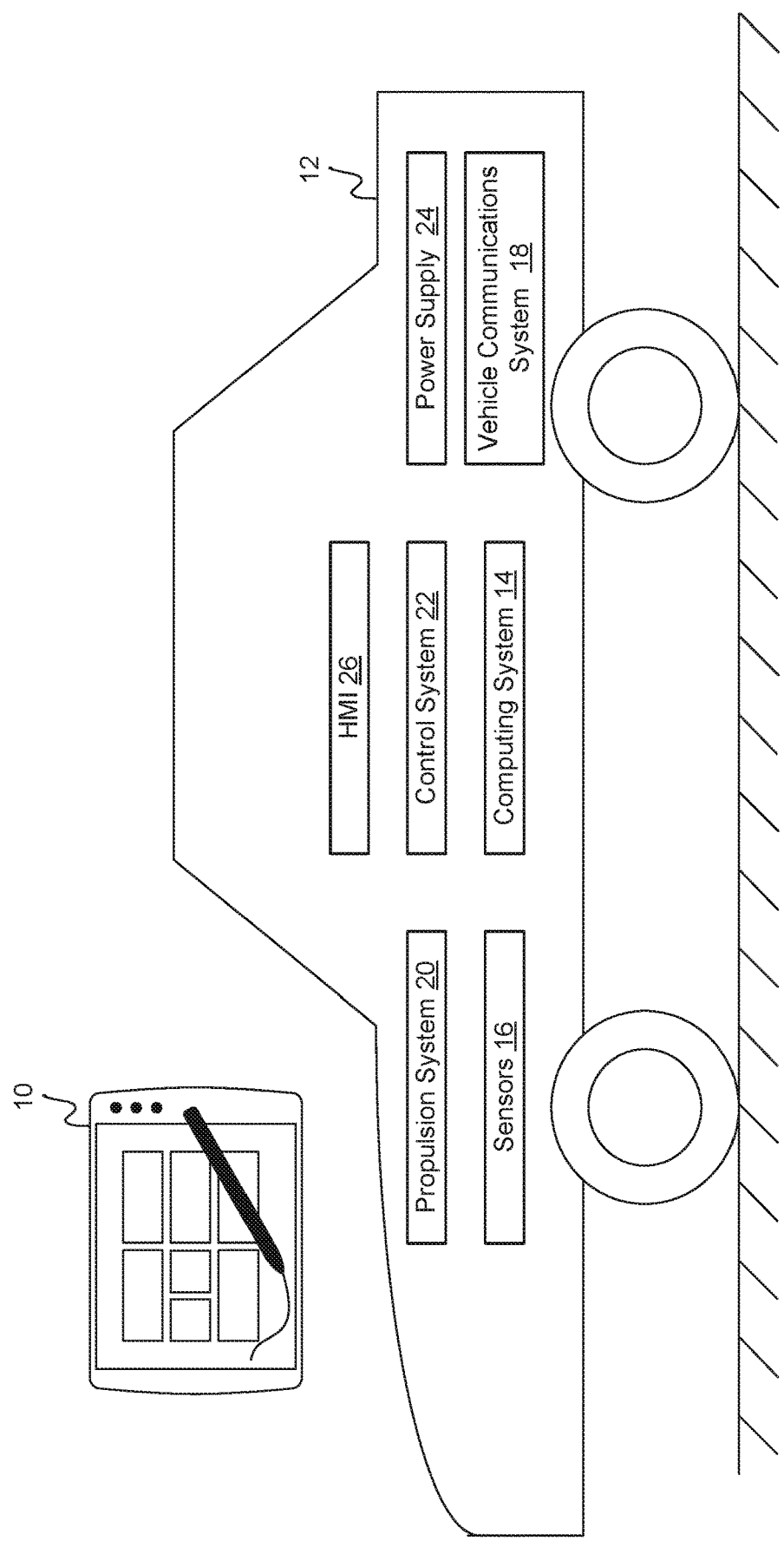
FIG. 1*a* illustrates a system diagram of the present disclosure for testing a vehicle HMI and vehicle components.

FIG. 1a illustrates a diagram of the present disclosure for testing a vehicle system under test ("VUT"). In an example embodiment, a test system 10 is coupled to a VUT 12, where the VUT 12 may comprise a computing system 14, sensors 16, a vehicle communications system 18, a propulsion system 20, a control system 22, a power supply 24, and a human-machine user interface ("HMI") 26. In other embodiments, the VUT 12 may include more, fewer, and/or different systems, and each system may include more, fewer, and/or different components. Additionally, the systems and/or components may be combined and/or divided in a number of arrangements. For instance, the VUT 12 can be merely a test bench of vehicle cluster instruments with one or more HMIs.

The computing system 14 can be adapted to transmit data to, receive data from, interact with, process computer instructions for, and/or control one or more of the propulsion system 20, the sensors 16, the control system 22, and any other components of the VUT 12. The computing system 14 may be communicatively linked to one or more of the sensors 16, vehicle communications system 18, propulsion system 20, control system 22, power supply 24, and HMI 26 by a system bus (e.g., CAN bus), a network (e.g., via a vehicle-to-vehicle, vehicle-to-infrastructure, vehicle-to-device, and so on), and/or other data connection mechanism.

In at least one embodiment, the computing system 14 may be adapted to store data in a local data storage and/or communicatively coupled to an external data storage. It can be appreciated that the data can also be transmitted to a cloud service and received from the cloud service via over-the-air ("OTA") wireless techniques.

In another embodiment, the computing system 14 may be adapted to cause the sensors 16 to capture images of the surrounding environment of the VUT 12. In yet another embodiment, the computing system 14 may control operation of the propulsion system 20 to autonomously or semi-autonomously operate the VUT 12. As yet another example, the computing system 14 may be adapted to store and execute instructions corresponding to an algorithm (e.g., for steering, braking, and/or throttling) from the control system 22. As still another example, the computing system 14 may be adapted to store and execute instructions for determining the environment around the VUT 12 using the sensors 16. These are just a few examples of the many possible configurations of the computing system 14.

The computing system 14 can include one or more processors. Furthermore, the computing system can have its own data storage and/or use an external data storage. The one or more processors may comprise one or more general-purpose processors and/or one or more special-purpose processors. To the extent the processor includes more than one processor, such processors could work separately, in parallel, or in a combination thereof. Data storage of the computing system 14, in turn, may comprise one or more volatile and/or one or more non-volatile storage components, such as optical, magnetic, and/or organic storage. The data storage may be integrated in whole or in part with the one or more processors of the computing system 14 and may be communicatively coupled to the data storage. In some embodiments, data storage of the computing system 14 may contain instructions (e.g., program logic) executable by the processor of the computing system 14 to execute various vehicle functions (e.g., the methods disclosed herein).

The term computing system may refer to data processing hardware, e.g., a CPU and/or GPU, and encompasses all kinds of apparatus, devices, and machines for processing data, including by way of example a programmable processor, a computer, multiple processors, computers, cloud computing, and/or embedded low-power devices (e.g., Nvidia Drive PX2). The system can also be, or further include, special purpose logic circuitry, e.g., an FPGA (field programmable gate array) or an ASIC (application-specific integrated circuit). The system can optionally include, in addition to hardware, code that creates an execution environment for computer programs, e.g., code that constitutes processor firmware, a protocol stack, a database management system, an operating system, or a combination of one or more of them. A computer program can also be used to emulate the computing system.

A computer program which may also be referred to or described as a program, (software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The sensors 16 may include a number of sensors adapted to sense information about an environment in which the VUT 12 is located, as well as one or more actuators adapted to modify a position and/or orientation of the sensors. The sensors can include a global positioning system ("GPS"), an inertial measurement unit ("IMU"), a RADAR unit, a laser rangefinder and/or one or more LIDAR units, and/or a camera. In some embodiments, the sensors 16 may be implemented as multiple sensor units, where each unit can be mounted to the VUT 12 in a respective position (e.g., top side, bottom side, front side, back side, right side, left side, etc.).

The vehicle communications system 18 may be communicatively coupled (via wires and/or wirelessly) to one or more other vehicles, sensors, or other devices, either directly and/or via one or more communications networks. The wireless communication system 18 may include an antenna and a chipset for communicating with the other vehicles, sensors, servers, and/or other devices either directly or via the one or more communications networks. The chipset or wireless communication system 18 in general may be arranged to communicate according to one or more types of wireless communication (e.g., protocols) such as BLUETOOTH, communication protocols described in IEEE 802.11 (including any IEEE 802.11 revisions), cellular technology (such as V2X, V2V, GSM, CDMA, UMTS, EV-DO, WiMAX, or LTE), ZIGBEE, dedicated short range communications (DSRC), and radio frequency identification ("RFID") communications, among other possibilities. The wireless communication system 18 may take other forms as well.

The propulsion system 20 may be adapted to provide powered motion for the VUT 12. The propulsion system 20 may include various components to provide such motion, including an engine/motor, an energy source, a transmission, and wheels/tires. The engine/motor may include any combination of an internal combustion engine, an electric motor (that can be powered by a battery, fuel cell and/or other electrical storage device), and/or a steam engine. Other motors and engines are possible as well.

The control system 22 may be adapted to control operation of the VUT 12 and its components. The control system 22 may include various components (now shown), including a steering unit, a throttle, a brake unit, a perception system, a navigation or pathing system, and an obstacle avoidance system.

The power supply 24 may be a source of energy that powers the engine/motor of the VUT 12 in full or in part and/or powers the electrical equipment of the VUT 12. The engine/motor of the VUT 12 may be adapted to convert the power supply 24 into mechanical energy. Examples of energy sources for the power supply 24 include gasoline, diesel, propane, other compressed gas-based fuels, ethanol, solar panels, batteries, and/or other sources of electrical power. The energy sources may additionally (or alternatively) include any combination of fuel tanks, batteries, capacitors, and/or flywheels. In some embodiments, the energy source may provide energy for other systems of the VUT 12 as well.

The HMI 26 may include HMI software and/or peripherals, e.g., a touchscreen, a microphone, speaker, a radio player, a media player, a navigation system, voice recognition system, application connect program, wireless communications system, heating, ventilation, and air conditioning ("HVAC") system, mobile devices, etc.

In some embodiments, the VUT 12 may include one or more elements in addition to or instead of those shown. For example, the VUT 12 may include one or more additional interfaces and/or power supplies. Other additional components are possible as well. In such embodiments, the data storage of the computing system 14 may further include instructions executable by the processor of the computing system 14 to control and/or communicate with the additional components. The VUT 12 further comprises a bus system (e.g., a controller area network ("CAN") bus system, Flexray, and/or other computing buss system) to communicatively couple the various components of the VUT 12.

The test system 10 is communicatively coupled via wireless and/or wired connections to the VUT 12. In an embodiment, the test system 10 can interface the CAN bus to read control and data signals, initiated by the HMI 26, between the computing system 14 and the various VUT 12 components (e.g., the HVAC, sensors 16, control system 22, vehicle communications system 18, etc.).

The test system 10 can score responsive outputs to test cases for the HMI 26. The criteria for scoring includes comparing anticipated HMI outputs responsive to the test cases with the actual HMI outputs of the test cases. If there is no difference between the anticipated HMI output and the actual HMI output for a corresponding test case, then a score, indicative of passing the corresponding test case (e.g., "100 percent match", "1", "pass", etc.), is assigned for that test case. If there is a difference between the anticipated HMI output and the actual HMI output for a corresponding test case, then a score, indicative of failing the corresponding test case (e.g., "50 percent match", "0", "fail", etc.), is assigned for that test case. If the difference between the anticipated HMI output and the actual HMI output is within a certain threshold (e.g., not meeting a passing percentage match or below a failing percentage match), the testing system 10 can flag the corresponding test case and actual HMI output for user notification. Since there is typically a large number of test cases that are performed on the HMI 26, a report listing the passing test cases, the failing test cases, and/or the test cases that are flagged for user review can be displayed to the a user of the test system 10.

The test system 10 is adapted to generate test cases for the HMI 26 and score the HMI 26's responsive outputs to indicate whether each one of the HMI outputs passed a test case, failed a test case, and/or flagged as not having a definitive pass or fail indication to alert the user of the test system 10. For instance, if the HMI 26 displays the HVAC status and a test case is to turn the air conditioning on by touching a select area of the HMI 26, that area of the HMI 26 can be touched and the resulting operation can be recorded by the test system 10 to score the HMI 26's output.

In an embodiment, the test system 10 comprises a computing device to learn, perform, and evaluate user interface test cases for a vehicle having a processor, memory, and communication circuitry, a display screen for communicating with a user of the test system 10, a camera system to record the HMI outputs, a speaker to output audio test cases, a microphone for recording audio outputs from the VUT 12 and the audio test cases from the speaker, a robotic arm for performing analog inputs on the HMI, and/or other components to perform the functions of the test system 10 described herein. In an embodiment, the test system 10 may further comprise an interface module to read the control and data signals of the VUT 12 and to write control and data signals of the VUT 12. The interface module may be wired to the CAN bus within the VUT 12 or connected wirelessly to the VUT 12 to obtain such signals.

It can be appreciated that the computing device and the other components and sub-systems of the test system 10 can be merged together in a single device or be remotely connected via a wireless or wired connection. For instance, the computing device can be a smart phone, computing tablet, laptop, dedicated testing unit, and/or other mobile device, where the computing device may have a camera, a microphone, a speaker built into the computing device. In other embodiments, the test system can be embedded in the VUT such that the computing device of the VUT can be adapted to implement the test system 10 and perform the test system 10's operations.

In some embodiments, the computing device of the test system 10 is communicatively coupled to the robotic arm to control the robotic arm to press on the touch sensitive display screen(s) of the HMI 26. In this manner, the test system 10 can perform physical touch test cases on the HMI 26. Furthermore, once a test case action is initiated, the test system 10 can use its camera and microphone to record the display screen of the HMI 26, audio from the HMI, and/or the control and data signals for indication of an initiation by the HMI 26 of a component of the VUT 12.

Figure 1B:
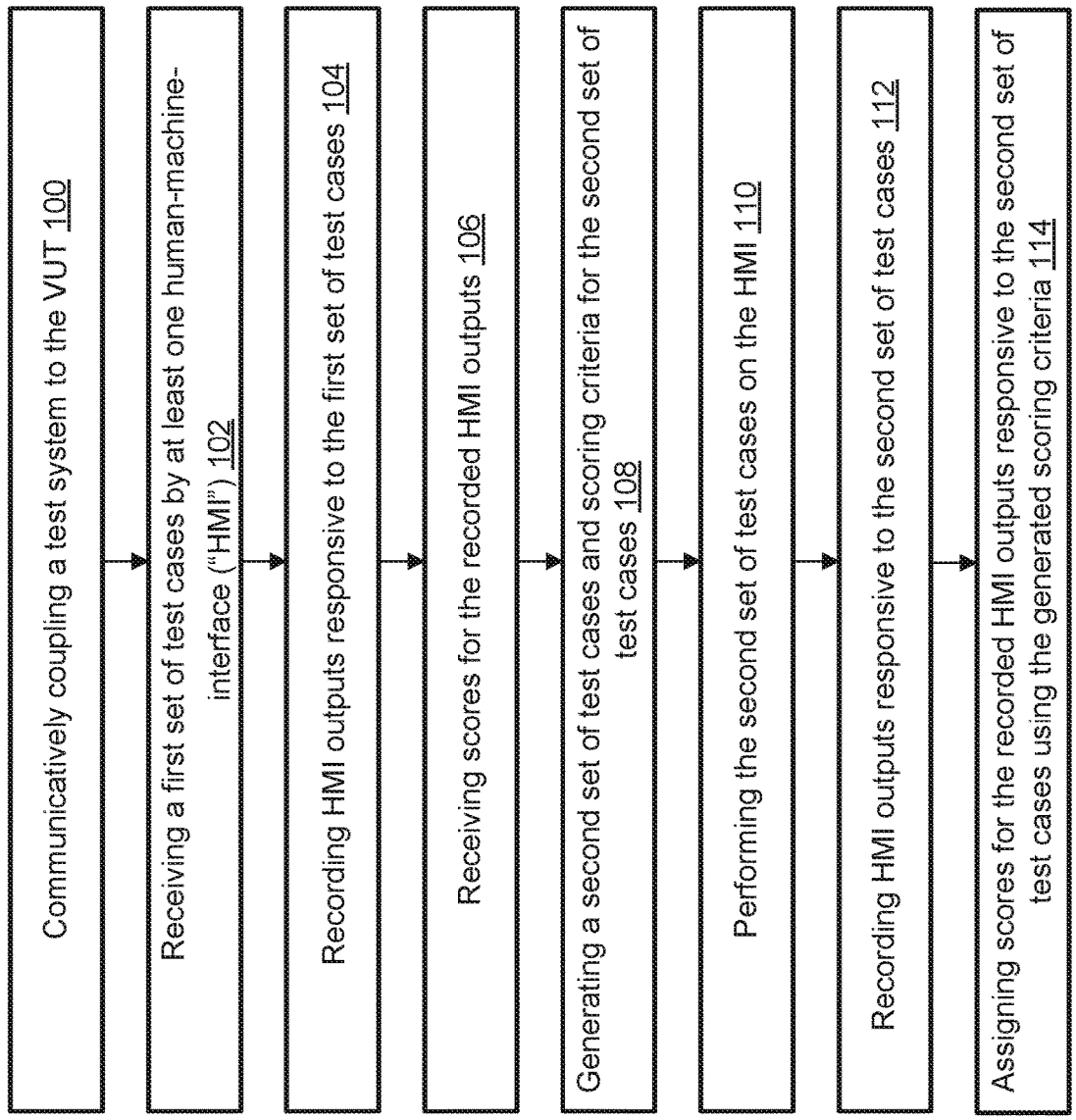
FIG. 1*b* illustrates a flow diagram of the present disclosure for testing a vehicle.

FIG. 1b illustrates a flow diagram of the present disclosure for testing a vehicle. Referring to FIG. 1b, a test system is communicatively coupled to a VUT 100 to test at least one HMI of the VUT. The test system can comprise an interface module to read the control and signals of the VUT via a wired connection and/or wireless connection. In an embodiment, the testing system is wired to a CAN bus system of the VUT for reading such control and data signals via an interface module of the test system.

The HMI receives a first set of test cases 102. A user of the test system can manually apply each one of the first set of test cases to the HMI. The testing system can store a listing of test cases and any responsive HMI outputs corresponding to such test cases. Metadata for the test cases and the responsive HMI outputs can also be stored, e.g., a test case type, time stamps, area(s) of a display of the HMI to be tested and touched, type of HMI being tested, whether a manual input and/or audio input are needed to apply the test case, control and data signal initiated by the HMI during the test, etc.

The test system records HMI outputs responsive to the first set of test cases 104. The test system comprises a camera system for taking screen shots of the HMI and/or a microphone for recording any audio outputs from the HMI. In an another embodiment, the testing system is coupled communicatively to the computing system of the VUT to read the video output to a display screen of the HMI and to read any audio output to a speaker of the HMI.

The test system receives scores for the recorded HMI outputs that are responsive to the first set of test cases 106. For instance, a user may go through a process of manually inputting each one of the first set of test cases, and then manually scoring each responsive HMI output. The test system can learn from this supervised training of what responsive HMI output passes or fails a particular test case using machine learning techniques.

The test system generates a second set of test cases and scoring criteria for the second set of test cases based on the received first set of test cases and the recorded HMI outputs responsive to the first set of test cases 108. The second set of test cases can be inferred variations of the first set of test cases. For instance, for a touch slide bar of the HMI that controls the radio tuning, the first set of test cases can test two end points of the touch slide bar and generate the responding HMI outputs for those test cases. The test system can generate additional test cases for the middle points of the touch slide bar and infer what responsive HMI outputs would pass such generated test cases. The anticipated outputs for the generated test cases can be inferred through linear regression from the responsive HMI outputs to the test cases for the two end points of the touch slide bar.

In another embodiment, the second set of test cases is inferred from the first set of test cases using a machine learning algorithm. A deep neural network ("DNN") can be trained using the first set of test cases, the recorded HMI outputs responsive to the first set of test cases, and the received scores for the recorded HMI outputs responsive to the first set of test cases.

In yet another embodiment, the second set of test cases can include one or more test cases from the first set of test cases. The repeated test cases can give a historical testing record of whether the test cases pass at different times for different VUT states (e.g., after running different preceding test cases on the VUT than previous times the repeated test case was applied. The addition of one or more test cases from the first set of test cases can be randomly picked and added to the generated set of test cases for the second set of test cases.

Referring to FIG. 1b, the test system performs the second set of test cases on the HMI 110. Depending on the test case, the test system may comprise subsystems, components, and/or devices for applying analog inputs to the HMI. For instance, the test system may have a robotic arm, speaker, and/or other component adapted to apply a test case to the HMI. For test cases that require a touch input, the robotic arm can be used to perform such touch inputs on the HMI in accordance with the generated second set of test cases.

Any responsive HMI outputs to the second set of test cases are recorded 112. The test system can use the camera system for taking screen shots of the HMI and/or a microphone for recording audio outputs from the HMI. Alternatively, the testing system can be coupled communicatively to the computing system of the VUT to read the video output to a display screen of the HMI and to read any audio output to a speaker of the HMI. Furthermore, the recorded HMI outputs responsive to the second set of test cases can include any control and/or data signals initiated by the HMI to confirm whether the HMI is interfacing with the other components in the VUT properly.

Once the responsive HMI outputs are recorded, the test system can evaluate the generated test cases and the responsive HMI outputs to provide a score for each of the generated test cases and the responsive HMI outputs 114.

In an embodiment, the generated second set of test cases and the recorded HMI outputs responsive to the second set of test cases are inputted to the DNN and the DNN assigns scores for the recorded HMI outputs responsive to the second set of test cases.

Optionally, in an embodiment, the assigned scores for the generated second set of test cases can be displayed by the test system. The displayed assigned scores includes identification of at least one HMI screen anomaly of the recorded HMI outputs responsive to the performed second set of test cases. Furthermore, a request for clarification can be generated to a user for user indication of whether one or more areas of the at least one HMI screen anomaly are acceptable. The user indication of the one or more areas of the at least one HMI screen anomaly as acceptable can include selecting at least one area of the at least one HMI screen to indicate acceptable area of deviation. For instance, the user indication may correspond to an area of presentation of artwork on the HMI, which can change based on a selected item on the HMI. Thereby, the assigned cores are generated (and/or recalculated) based on the user indication.

In yet another embodiment, the test system for user interface testing of a VUT, comprises: a camera, a VUT interface, a computing device, where the computing device comprises: at least one memory adapted to store data; and at least one processing device operatively coupled to the memory, the processing device adapted to: receive, by at least one human-machine-interface ("HMI") of the VUT, a first set of test cases, record HMI outputs responsive to the first set of test cases; receive scores for the recorded HMI outputs responsive to the first set of test cases; generate a second set of test cases and scoring criteria for the second set of test cases based on the received first set of test cases and the recorded HMI outputs responsive to the first set of test cases; perform the second set of test cases on the HMI; record HMI outputs responsive to the second set of test cases; and assign scores for the recorded HMI outputs responsive to the second set of test cases using the generated scoring criteria.

The VUT interface can be adapted to be communicatively coupled to a CAN bus of the VUT and the at least one processing device, where the at least one processing device is adapted to record controls signals received via the VUT interface. The at least one processing device is communicatively coupled to the camera and the at least one processing device is adapted to record, via the camera, the HMI outputs responsive to the first set of test cases and the HMI outputs responsive to the second set of test cases.

Additionally, the test system may comprise a microphone. The at least one processing device is communicatively coupled to the microphone and adapted to record, via the microphone, the HMI outputs responsive to the first set of test cases and the HMI outputs responsive to the second set of test cases.

Furthermore, the test system further comprises at least one robotic arm, where the robotic arm is adapted to perform touch inputs on the HMI in accordance with the generated second set of test cases.

Figure 2:
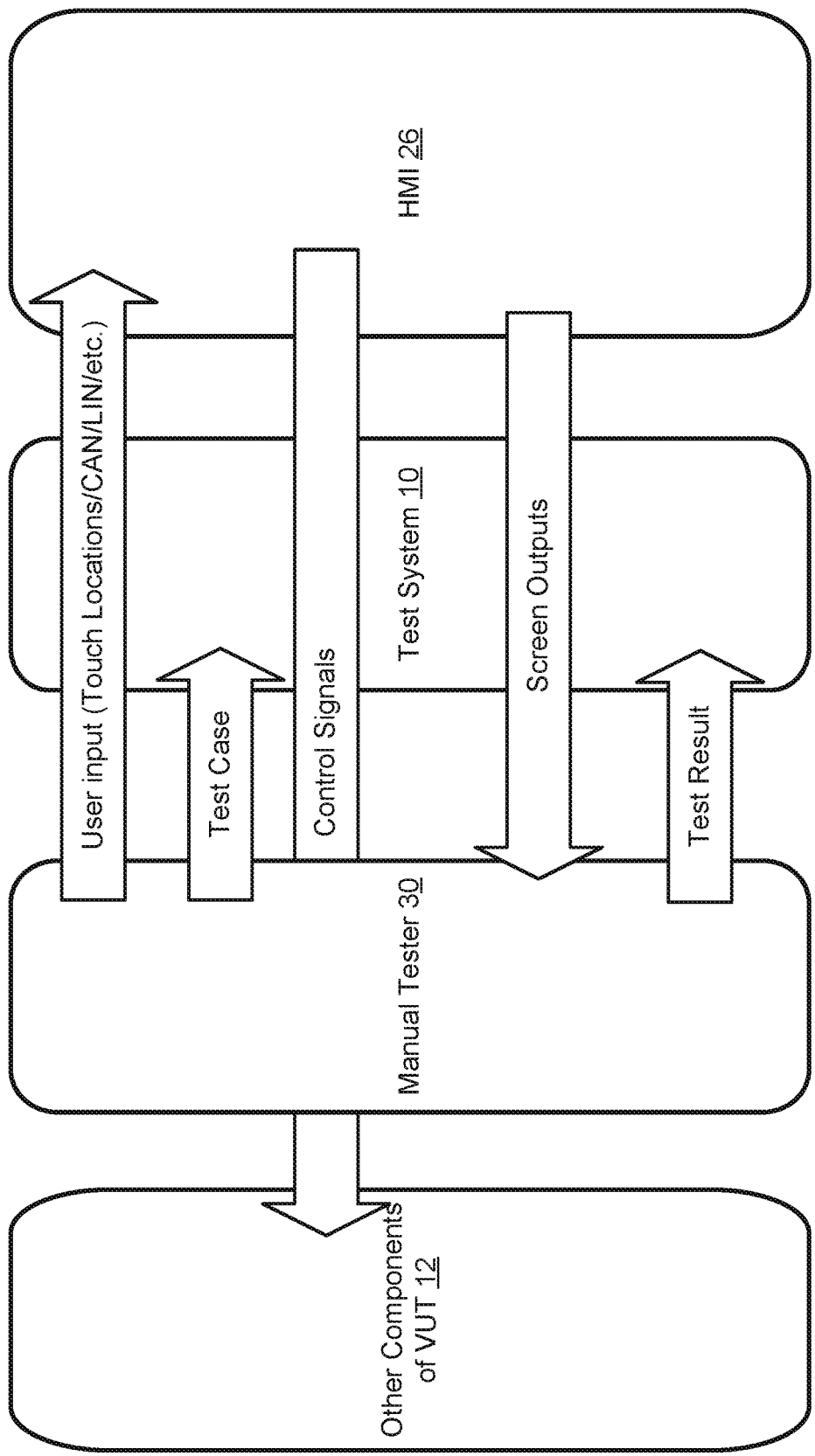
FIG. 2 is a diagrammatic view of a baseline instructional portion of a testing operation for transportation vehicle user interfaces showing that a human (manual) tester, as a user, provides inputs to an HMI and the HMI provides responsive outputs which a test system can record for later automated operations.

Referring to FIG. 2, a learning portion for the test system 10 is illustrated in which human (manual) input may be provided by the user (manual tester) 30 to the HMI 26 that is the subject of the testing. The HMI 26 may include a display screen embodied as a touch screen user interface. The HMI 26 may also include multiple touch screen displays within the VUT 12.

In an embodiment, a test system procedure can employ dual phases, in which a first phase of automation setup is performed and then a second phase of automated test execution based on the learned setup is initiated. In the learning phase of hybrid test system, the test system 10 may receive and/or observe indication of the inputs by the manual tester as a test case from the user to the HMI 26 (i.e., the system under test). The user inputs may include touch gesture parameters (duration, length of travel, number of touch points, coordination of touch points, location) and/or messages (CAN, LIN, etc. which can be made via the test system 10).

The test system 10 may receive outputs from the HMI 26 as a test result responsive to the user inputs. The test system 10 may use its camera and/or mic to record the HMI 26's response to the user input. The manual tester 30 can record on the test system 10 whether that particular HMI 26 output response was an anticipated result (i.e., a passing result of the test case) or an unanticipated result (i.e., a failing of the test case). Thus in the learning phase, the test system 10 receives at least one or more of the following inputs: (1) manual user input by recording the user's action for a test case via the camera, user input, and/or microphone of the test system 10; (2) control signals initiated by the HMI 26 as a result of the user action; (3) screen output of the HMI 26; and (4) user input of whether the HMI 26 output passes or fails a particular test case. Accordingly, the test system 10 can receive baseline information regarding the desired testing operations and responses from the HMI 26.

With these baseline information (e.g., ground truth), the test cases and the ground truth can be inputted to a neural network to determine other test case scenarios and the resulting matches for a pass or a fail of those determined other test cases.

Figure 3:
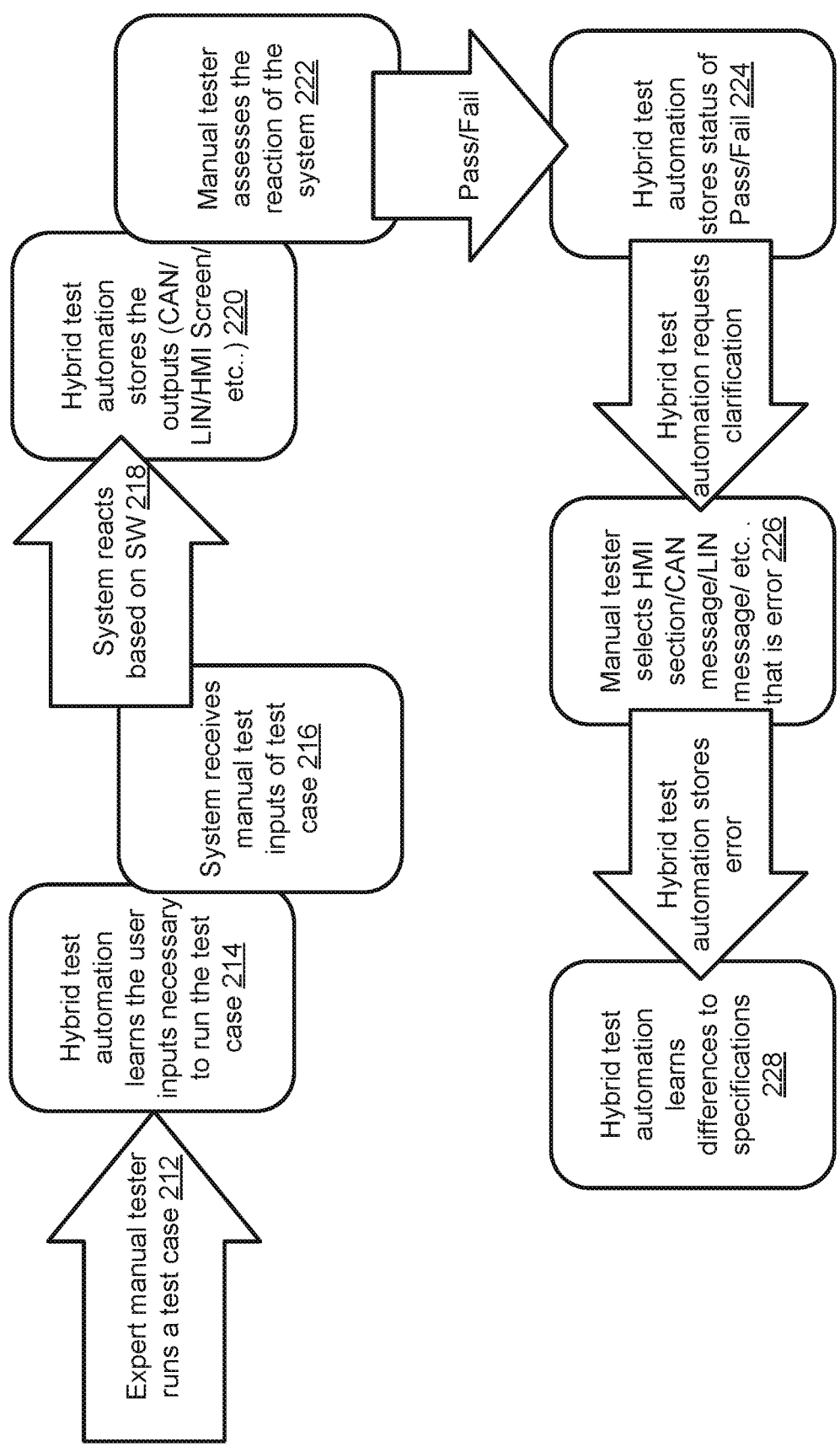
FIG. 3 is a flow diagram indicating portions of the baseline instructions as a learning portion of the test system operation.

Referring to FIG. 3, in an embodiment of the test system procedure, a learning process is illustrated. For example, as shown at 212, the user may run a test case by operating the HMI 26 through a predetermined operation of the test, for example, navigating the HMI 26 to call up a song list and play a selected song. Subsequently, control may proceed to 214, at which the test system 10 may receive indication of the input(s), location of the input(s) on the HMI 26 timing, and/or other operations that the manual tester applied to perform the predetermined operation of the test.

Control may then proceed to 216, at which the HMI 26 may receive the user inputs, and, at 218, the HMI 26 provides a responsive output to the user inputs based on its underlying architecture, e.g., software programming. At 220, the test system 10 may store the output(s) of the HMI 26. The stored outputs may include one or more captured images of the display of the HMI 26 for evaluation, one or more audio outputs from the HMI 26, and/or control and data signals generated via the HMI 26 to other components of the VUT 12.

Control then proceeds to 222, at which the user may evaluate the outputs from the HMI 26. The user may indicate whether the outputs from HMI 26 constitute a passing or failing of the respective test case. For example, if the output of the HMI results in placing an icon or information at the wrong position of a touchscreen of the HMI 26, this would be an error and consequently a failure of the test case. Control then proceeds to 224, at which the test system 10 may store the user indications of pass and/or fail. The test system 10 may capture an image of the screen which was indicated as pass and/or fail for future reference. Control then proceeds to 226, at which the test system 10 may request clarification from the user regarding screens of the display which were indicated by the user as fails, and the user can provide input regarding the operation indicated as failing the test case. For example, the test system 10 may present to the user the captured image of the HMI 26's display screen. The user may select an area of the display screen which contains errant operation, for example, the user may select a portion of the HMI screen which contains an incorrect position of an icon or information.

Control may then proceed to 228, at which the test system 10 may store and/or incorporate the clarification information to learn the differences between the specification and the outputs of the HMI 26.

Figure 4:
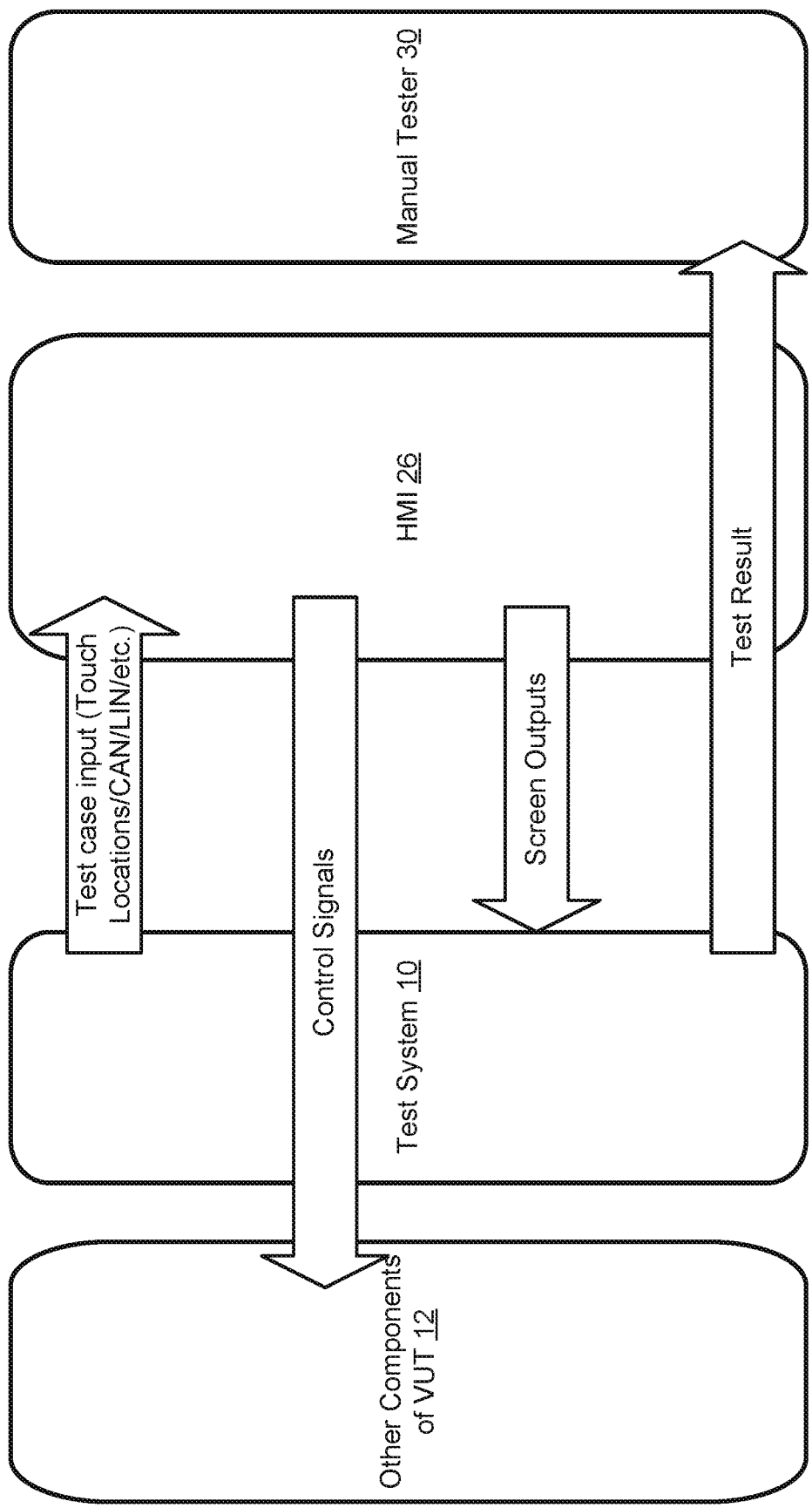
FIG. 4 is a diagrammatic view of an automated portion of the test system operation in which a test system performs automated evaluation of the HMI and provides an evaluation output for test cases.

Referring now to FIG. 4, an automated portion of the testing operation includes active evaluation of the HMI. The test system 10 provides inputs to the HMI 26 based on the learning portion. For example, the test system 10 may provide the same or similar touch sequence as observed from a user during the learning portion and/or generated test cases. The test system 10 may receive and monitor the outputs from the HMI 26. The outputs may include HMI screen outputs and/or control signals, such as messages, for other systems of the transportation vehicle. The test system 10 may compare outputs from the HMI 26 with the baseline information from the learning portion of the testing operation, for example, user scores of pass and/or fail. The test system 10 may generate an evaluation output for presentation to the user (e.g., the manual tester 30) and/or escalate the test cases relating to the failed operations.

In an embodiment, if a fail result for a test case is found, the test system 10 can add a predefined number of test cases related to that fail test. Each test case may have metadata to characterize the parameters of the test and/or overall subject of the test case. For instance, a test case may be identified as a radio related test, a HMI touchscreen test, an ADAS visualization test, a HVAC test, etc. After running a test case and receiving a fail result, the test system 10 can add new test cases that relate to the metadata of the failed test case to analyze the scope of the failure. This can be performed without user intervention or instruction such that the overall efficiency and adaptability of the testing are significantly increased.

In another embodiment, the test system 10 may also use its microphone to record voice responses, HMI voice prompts, and timings thereof from the HMI 26. The audio recordings of the test system 10 can then be compared to stored user failed and pass results. In addition, the recorded test case responses can also be analyzed to real time to determine whether the recorded audio matches the anticipated response. This comparison can be done in real time and/or uploaded to a backend server for further analysis. During this analysis, the recorded voice prompts can be mirrored with other systems to give a ground truth for comparison of the test case. For instance, if the test system 10 is to perform a personal digital assistant testing of the HMI 26, the test system 10 can provide various questions and actions for the personal digital assistant to answer and/or perform. The test system 10 would then record the audio responses and/or screen shots to the HMI 26 to record the response from the HMI 26. In addition, the control signals from the HMI 26 can additionally be monitored to confirm that any requested action be initiated by the HMI 26. For instance, if the test system 10 provides an oral command to the personal digital assistant to set the in cabin temperature to 70 degrees Fahrenheit, the test system 10 can also monitor the control signals from the HMI to the HVAC to confirm that the HMI did indeed initiate such command.

Figure 5:
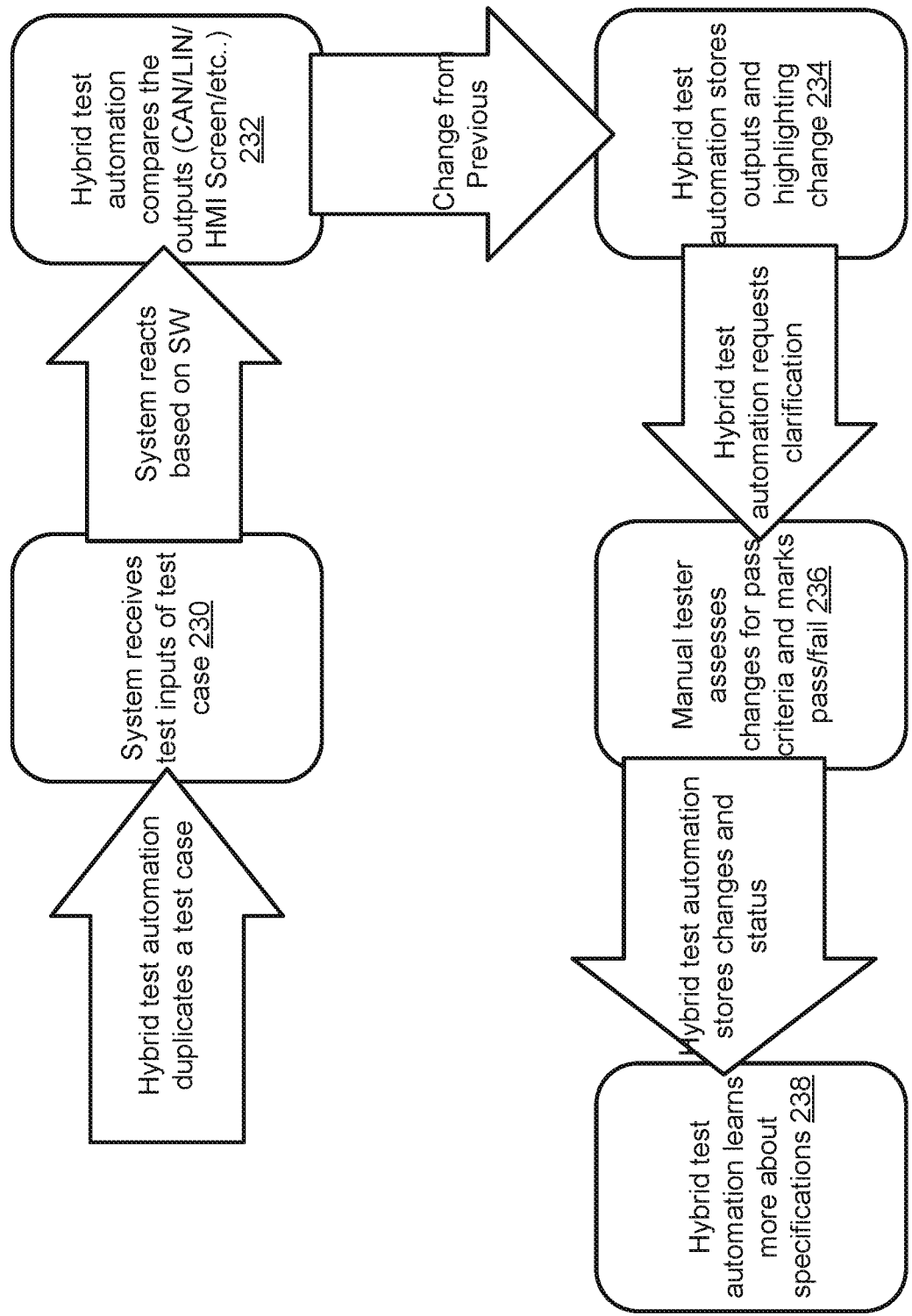
FIG. 5 is a flow diagram indicating portions of the automated portion of the test system operation as an execution portion by the test system.

Referring to FIG. 5, a test system of the present disclosure may duplicate and/or provide the same or similar test operation sequence as performed by a manual user during the learning portion. Thus, at 230, the HMI 26 may receive the test case inputs from the test system 10 and provide responsive outputs. Control then proceeds to 232, at which the test system 10 may compare the test case outputs to the baseline information from the learning portion of the testing operation. Control then proceeds to 234, at which the test system 10 may store and/or output the differences or anomalies of the test case outputs from the baseline information as potential failures as part of an evaluation output for the user. For example, continuing the example of HMI screens, the test system may provide an image captured from the screen of the display of the test subject user interface with indication of a perceived difference in the HMI screen, e.g., a position or type of an icon or information different from the baseline information. The test system may request clarification from the user regarding the difference.

Control then proceeds to 236, at which the user may assess the evaluation output to provide clarification. For example, the user may determine that a difference (anomaly) in the type or location of an icon is a technical failure but should not fail the testing sequence as it is presently being updated in the development process. Control may then proceed to 238, at which the test system 10 receives the user indications of clarification to store the information in order to revise its evaluation process. Accordingly, the test system 10 may receive user input that the difference (anomaly) in the type or location of an icon is identified as a fix, pending further updating and not a new error. The user may select areas of the HMI screen as exempt from failure issues to provide additional clarification to the test system. Alternatively, the test system may receive input from the user indicating that the difference (anomaly) in the type or location of an icon is a new error to be counted as a failure.

Figure 6:
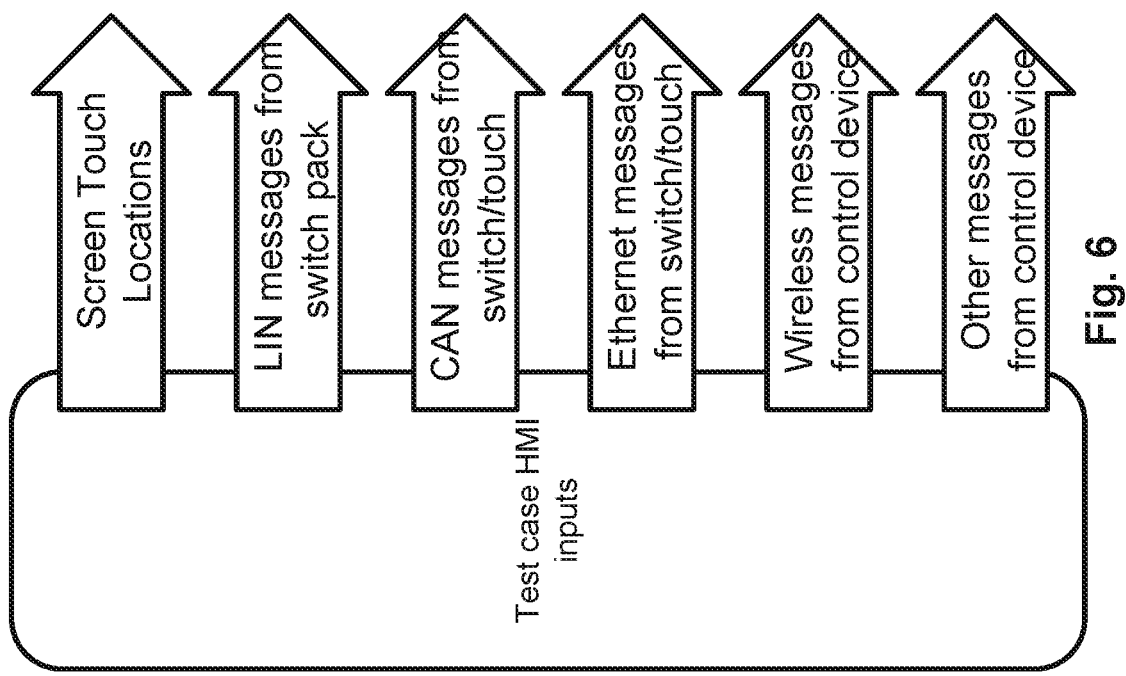
FIG. 6 is a diagrammatic view of a number of user inputs to the HMI.

Referring to FIG. 6, a number of possible user inputs to the test subject user interface is shown. For example, the user inputs can include screen touch locations, LIN messages, CAN messages, Ethernet messages, wireless messages, and/or other messages e.g., from transportation vehicle control system devices. The test system 10 may likewise provide the same range of types of inputs to the HMI 26.

Figure 7:
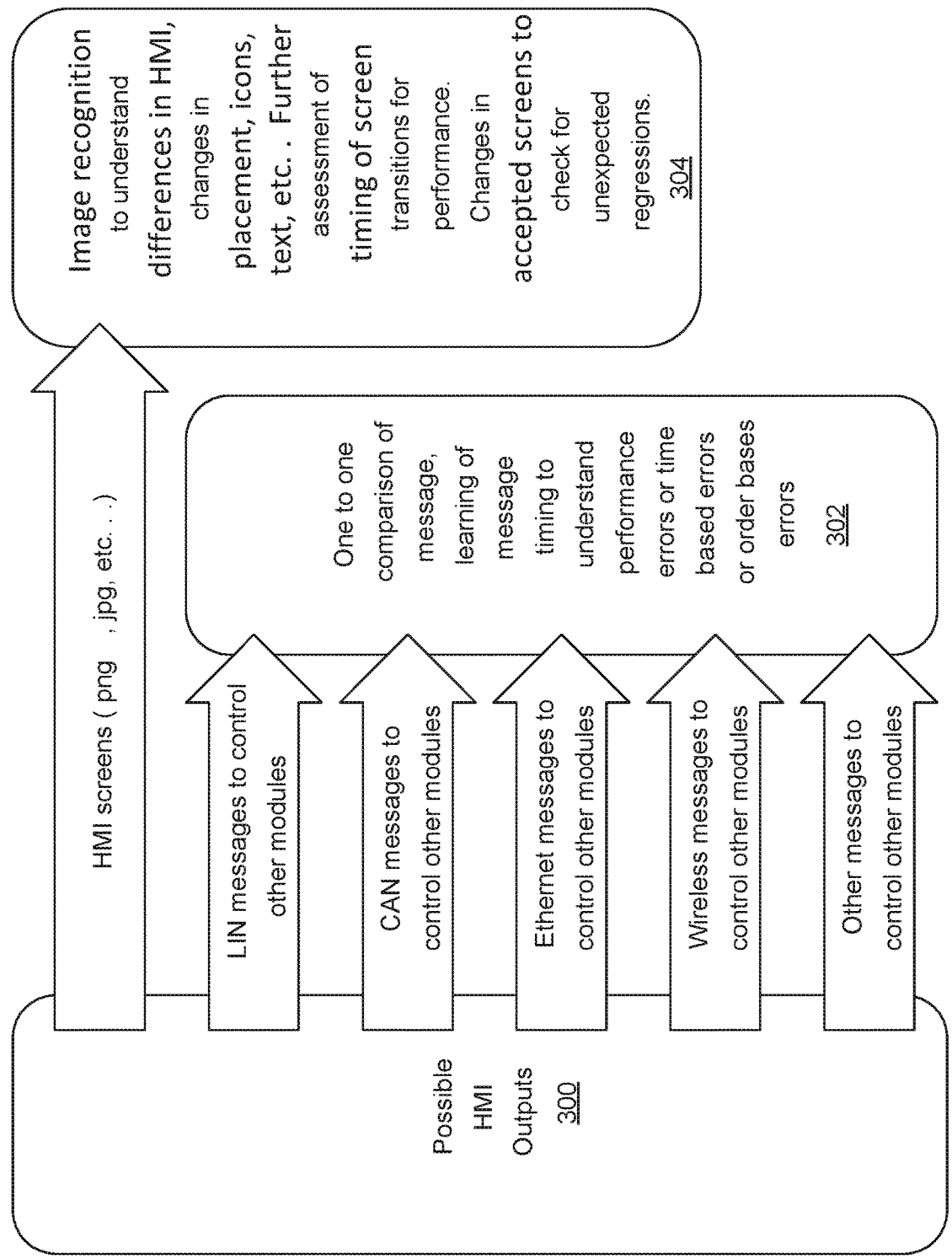
FIG. 7 is a diagrammatic view of a number of outputs from the HMI.

Referring to FIG. 7, the HMI 26 may provide a number of possible outputs (e.g., outputs 300). For example, the HMI 26 may, in response to inputs, provide HMI screens (e.g., png, jpg, etc.), LIN messages, CAN messages, ethernet messages, wireless messages, and/or other messages to other control systems of the transportation vehicle. The message outputs may provide the ability for one-to-one comparison of messages timing to assist in understanding performance issues, time-based issues, and/or the order and/or basis of issues 302. The HMI screen outputs may include screen images of the display which can assist in understanding differences in the HMI screen from the baseline information, can allow further assessment of the timing of screen transitions, and/or changes in the adapted screens, for example, to check for unexpected regressions 304.

Figure 8:
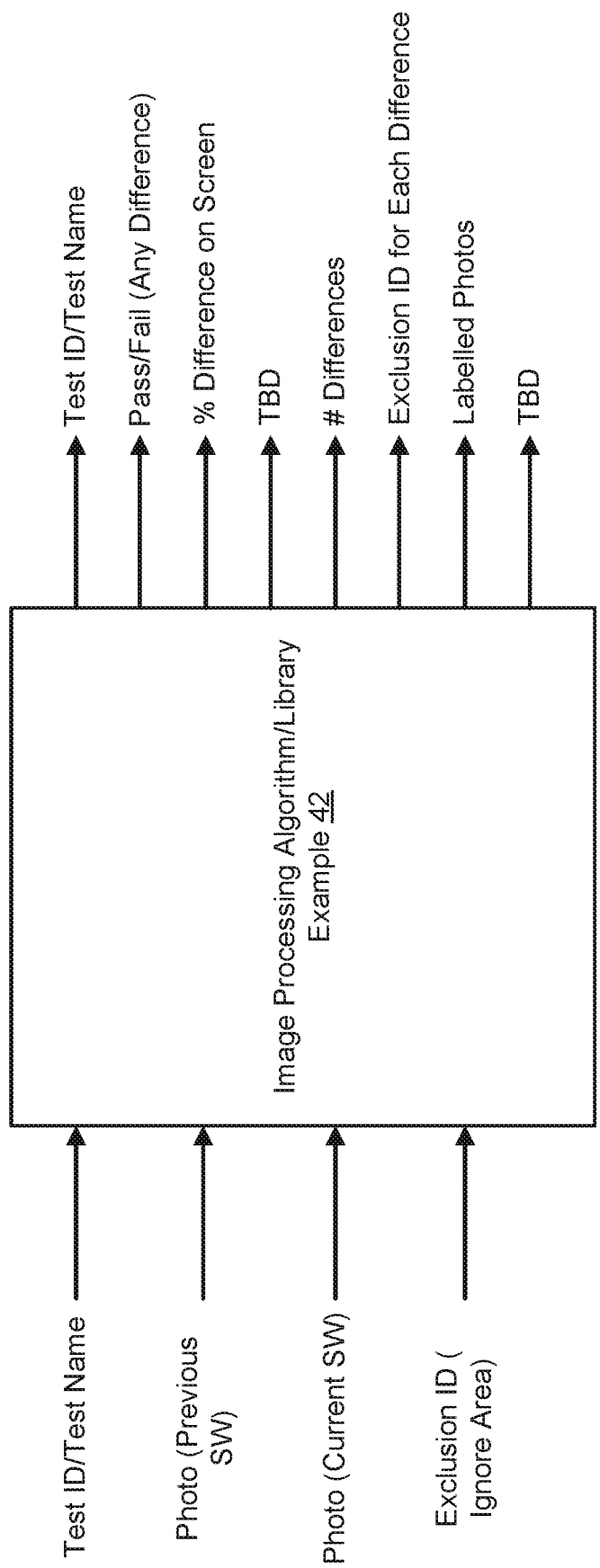
FIG. 8 is diagrammatic view of an image processing module of the test system which can consider images of the test subject user interface screens against known screen information to identify anomalies.

Referring now to FIG. 8, the test system 10 may include an image processing module 42. The image processing module 42 may receive and store an image library including information for each image such as Test ID (name), captured image of previous test operations such as from previous or baseline operations, current capture images for ongoing test operations, and/or exclusion ID (e.g., to exempt certain screen areas). The image processing module 42 may compare the received past and current images to identify differences, percentage of differences, number of differences, and may assembly such information together with any one or more of test IDs, exclusion IDs, labeled photos, and/or other similar information for output.

Figure 9:
FIG. 9 is an example of a captured image of a screen of a radio mode of HMI showing that an area of the screen has been selected in dashed line to indicate to the test system that the area may include changes from the baseline information which should not be counted as an error or failure, and particularly showing that the album art is selected and the information regarding the present artist and album.

Referring to FIG. 9, an example HMI screen captured during the testing operation including an indication provided by a user or computer program regarding areas of the HMI screen for exemption (e.g., exclusion from identification as error/failure of a test result). A graphical image 62 is shown embodied as album artwork for a track presently playing via a satellite radio provider. The graphical image 62 has been selected by a user and/or computer program as indicated by broken line box to clarify to the test system 10 that the graphical image 62 contains subjective information that does not necessarily constitute an error but reflects expectedly different information. Similarly, textual scripts 60 have been selected by the user and/or computer program to clarify to the test system 10 that the textual scripts 60 contain subjective information that also do not necessarily constitute an error but reflects expectedly different information. Accordingly, the user 12 and/or automated computer program can assist the test system 10 in delineating exemption information to clarifying testing operations.

Figure 10:
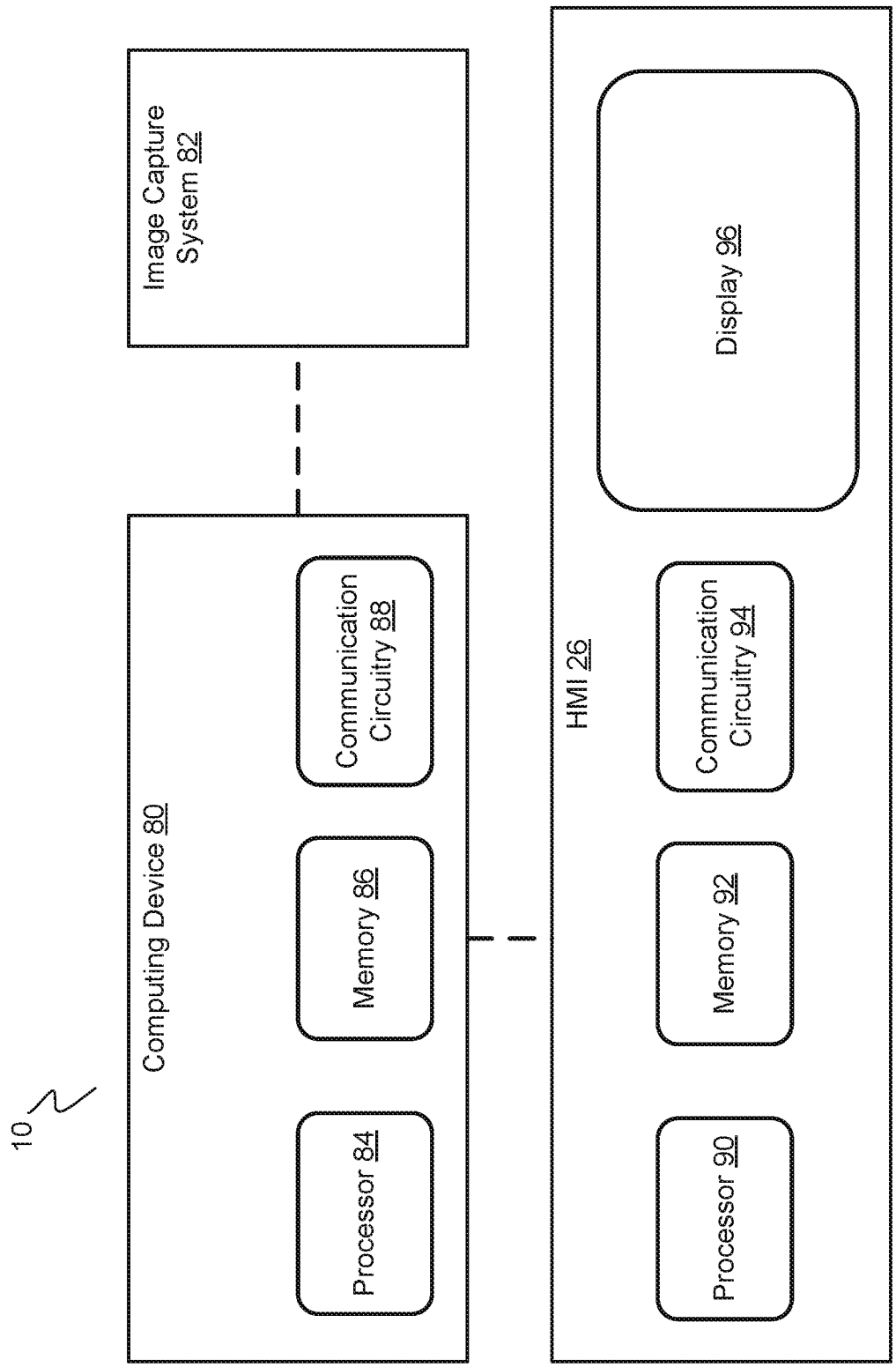
FIG. 10 diagrammatic view of the test system showing that it includes an interface test system and an image capture system in communication with the HMI.

Referring now to FIG. 10, a diagram of the test system 10 and communication with the HMI 26 is shown. The test system 10 may include a computing device 80 and an image capture system 82. The computing device 80 may include at least one processor 84, a memory 86 for storing instructions for execution by the at least one processor 84 to determine operational commands, and communication circuitry 88 for sending and receiving communications as directed by the processor 84. The image capture system 82 may include an image capture device for capturing HMI screen images of a display 96 of the HMI 26, embodied as a touchscreen infotainment center display.

The HMI 26 may include at least one processor 90, a memory 92 for storing instructions for execution by the at least one processor 90 to determine operational commands, and communication circuitry 94 for sending and receiving communications as directed by the processor 90. It should be understood that control of various disclosed operations and functionality may be performed using the processor 90 running software including instructions stored in the memory 92.

User interface ("UI"), user experience ("UX"), and/or human-machine interface testing can be quite time consuming to automate due to factors such as the vast number of permutations and the speed of program (e.g., software) development. Traditional automated testing arrangements may present little or no mechanisms built-in to assist in test automation in attempts to provide memory and/or storage efficiency. This may be particularly so for systems that have many different styles of user interface such as automotive UI/UX/HMI where one module may be shared by multiple different interfaces. With recent increases in agile development process, the testing may be required to be performed quite quickly within a single sprint session, and increasing the volume of testing can assist in finding errors present in software.

For example, traditional methods of providing wholly automated testing often required a team of highly skilled programmers creating an automation routine for each individual interface. This development would often be completed late in the interface development process.

Within the present disclosure, a test system may perform a hybrid or partly manual, partly automated process. Such test systems may include training of the automation machine. For example, manual (human) testers may perform specific baseline interface tests based on catalogues and/or experience. During this manual baseline time the machine tester observes and/or watches what is being done with respect to input (e.g., touch location), manual entry (rotary, buttons, etc.), and/or other inputs. The machine tester can then use image recognition to determine entries (look and location of soft key buttons, look of indicators when using entry hardware/switches/rotaries/etc. . . . ). Once an entry has been completed, the machine tester can then use image recognition to understand the response to the button press over time. The time for a task to be performed can be assumed by the amount of time the manual tester waits to observe the issues.

By way of example, in considering a radio of the transportation vehicle that is accessible via the user interface, the changing and/or updating of artist and/or title information on the display, for example, upon progression through a playlist or panning through selection options, requires no action by the tester, but requires to interface to remain untouched for some time until a change occurs. The machine tester can understand that a change in the display has occurred when the manual tester begins and completes the test case with a period of no interaction, but lines of information on the display change over that same time period. This may similarly occur for changes in album art being displayed according to the presently selected track.

By way of another example, in considering transportation vehicle navigation information, setting a destination for a long distance travel can take some processing time to complete the route calculation. This can also take additional time to display estimated times of arrival, determine traffic delays, and or perform other related calculations, etc. Based on the wait time observed from the manual tester, the machine tester can determine the change points on the screen of the display to complete the required test, such as the presence of a route on screen, estimated time of arrival, and/or traffic delay. The test system can then run a similar test that allows timing of test case success based on screen attribute changes.

By way of still another example, in considering attribute determination, the test system may set attributes against each test case (documented or free/experienced). Such attributes can include which screen changes occurred, what timing intervals were observed, and/or which touch points were associated with which image area, etc. Such attributes can fall into two major categories: (1) inputs, for example, button activations, incoming data (traffic information, radio station information, etc.), and/or any other input to the system that leads to a test case; and (2) outputs, which can include UI/UX/HMI reactions to the button activations (change in screen information, change in state, output of messages (control signals to other devices, messages generated for connected services, screen changes, and/or notifications on other screens, etc.)). Within the present disclosure, devices, systems, and methods for the manual tester to check what the machine tester associated with each test case can be offered to the user as an evaluation output for verification of correct training/learning by the machine tester.

Once the machine tester has established a set of test cases associated with its corresponding attributes, the machine tester can begin to run tests at a higher rate on multiple interface devices and continue running these with new software to continue testing for regression and/or new issues. Accordingly, the machine tester can also continue to test various software while developers and/or testers move onto other functionalities in line with the sprints. Thus, continuing to monitor features and functions that are no longer in focus by developers or testers. With software automation in the loop, testing can be done at a higher rate.

In considering of various aspects of the present disclosure, the test system can conduct verification. Because the machine tester has determined a set of input and output attributes, any errors found by the machine tester can be labeled with inputs used and outputs occurred, and then report what output attribute was considered as an error. As the test system is using image recognition and output signal assessment, it can provide a record to allow a manual tester to view what inputs occurred and what outputs occurred for verification of whether the reported failure is a failure by a manual tester.

Devices, systems, and methods within the present disclosure can be implemented to include use of manual testers to provide learning to a machine test system, thereby enabling the machine tester to push large numbers of test cases based on learning of manual test procedures and the experience of manual testers. Using manual testers to provide learning to a machine tester may initially seem counter to the primary idea of test automation, being the removal of manual test; however, in such an implementation, machine learning, test automation, and image processing may be blended to improve utility.

It should be understood that, in some disclosed embodiments, the user interface test system may perform an automated portion of active evaluation including communicating with the image capture system to capture an image of the test subject user interface.

In accordance with at least some disclosed embodiments, the interface test system may be adapted to receive user indication of acceptable area of deviation. The user indication of acceptable area of deviation may include selection of an area of the at least one HMI screen anomaly of the test subject interface screen. The interface test system may store the user indication of acceptable area of deviation.

In accordance with at least some disclosed embodiments, the evaluation output may be generated based on the user indication of acceptable area of deviation. The evaluation output may omit identification of HMI screen anomalies of the test subject user interface that are within the acceptable area of deviation as errors. The acceptable area of deviation may correspond to an area of presentation of artwork of a select item of interest of the test subject user interface which changes based on the particular select item. The evaluation output may include presentation of the automated inputs and presentation of a captured image of the output provided in response to the automated inputs.

Disclosed embodiments address the technical problem of the rapid rise of user interface operations required in transportation vehicles, which can require extension program development with highly dynamic evolution, e.g., including the dynamic development process as well as test such systems. Accordingly, disclosed embodiments provide a solution for such problems using inventive, automated test systems to assist with the challenges of user interface testing while providing flexibility by performing hybrid testing of transportation vehicle user interfaces which may include an image capture system for collecting images of user interfaces of the transportation vehicle, and an interface test system for analyzing the operations of user interfaces of transportation vehicles. More specifically, disclosed embodiments may provide utility by providing an interface test system may be adapted to receive baseline evaluation criteria comprising (i) receiving indication of manual user inputs to a test subject user interface, and (ii) receiving and storing user scores of baselines outputs of the test subject user interface responsive to the manual user inputs. Furthermore, the evaluation system may provide an evaluation output for user consideration. Such user consideration can include selection of areas of HMI screens as designated for omission of anomalies.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, disclosed embodiments are deemed to inherently include all such elements, variations, and modifications to the described aspects that would be known to those of ordinary skill in the art.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

I claim:

1. A method for user interface testing of a vehicle under test ("VUT"), comprising:
coupling, communicatively, a test system to the VUT;
receiving, by at least one human-machine-interface ("HMI") of the VUT, a first set of test cases;
recording, by the test system, HMI outputs responsive to the first set of test cases;
receiving, by the test system, scores for the HMI outputs responsive to the first set of test cases;
generating, by the test system, a second set of test cases and scoring criteria for the second set of test cases based on the first set of test cases and the HMI outputs responsive to the first set of test cases;
performing, by the test system, the second set of test cases on the HMI;
recording, by the test system, HMI outputs responsive to the second set of test cases; and
assigning, by the test system, scores for the HMI outputs responsive to the second set of test cases using the scoring criteria;
displaying the scores by the test system, wherein the displayed scores include identification of at least one HMI screen anomaly of the HMI outputs responsive to the second set of test cases.

2. The method of claim 1, wherein the test system is coupled to the VUT via a CAN bus of the VUT, and wherein the HMI outputs responsive to the second set of test cases include at least one control signal initiated by the HMI.

3. The method of claim 1, wherein the test system uses a camera to record the HMI outputs responsive to the first set of test cases and the HMI outputs responsive to the second set of test cases.

4. The method of claim 1, wherein the test system uses a microphone to record the HMI outputs responsive to the first set of test cases and the HMI outputs responsive to the second set of test cases.

5. The method of claim 1, wherein each of the scores is indicative of whether the HMI has passed, failed, or is flagged for user review for the first set of test cases.

6. The method of claim 1, wherein the second set of test cases is inferred from the first set of test cases using a machine learning algorithm.

7. The method of claim 1, training a deep neural network ("DNN") with the first set of test cases, the HMI outputs responsive to the first set of test cases, and the received scores for the HMI outputs responsive to the first set of test cases.

8. The method of claim 7, wherein the second set of test cases and the HMI outputs responsive to the second set of test cases are inputted to the DNN and wherein the DNN assigns scores for the HMI outputs responsive to the second set of test cases.

9. The method of claim 1, wherein the second set of test cases and the HMI outputs responsive to the second set of test cases are inputted to an image processing module and wherein the image processing module assigns scores for the HMI outputs responsive to the second set of test cases.

10. The method of claim 1, displaying the scores by the test system, wherein the displayed scores include identification of at least one HMI screen anomaly of the HMI outputs responsive to the second set of test cases.

11. The method of claim 1 wherein a request for clarification is generated to a user for user indication of whether one or more areas of the at least one HMI screen anomaly are acceptable.

12. The method of claim 11 wherein user indication of the one or more areas of the at least one HMI screen anomaly as acceptable includes selecting at least one area of the at least one HMI screen to indicate acceptable area of deviation.

13. The method of claim 12 wherein the assigned scores are generated based on the user indication.

14. The method of claim 12 wherein the user indication corresponds to an area of presentation of artwork on the HMI, which changes based on a selected item on the HMI.

15. A test system for a user interface testing of a vehicle under test ("VUT"), comprising:
- a camera;
- a VUT interface; and
- a computing device, the computing device comprises:
  - at least one memory adapted to store data; and
  - at least one processing device operatively coupled to the memory, the processing device adapted to:
    - receive, by at least one human-machine-interface ("HMI") of the VUT, a first set of test cases;
    - record HMI outputs responsive to the first set of test cases;
    - receive scores for the HMI outputs responsive to the first set of test cases;
    - generate a second set of test cases and scoring criteria for the second set of test cases based on the first set of test cases and the HMI outputs responsive to the first set of test cases;
    - perform the second set of test cases on the HMI;
    - record HMI outputs responsive to the second set of test cases;
    - assign scores for the HMI outputs responsive to the second set of test cases using the scoring criteria; and
    - display the scores, the displayed scores include identification of at least one HMI screen anomaly of the HMI outputs responsive to the second set of test cases;
- the VUT interface is adapted to be communicatively coupled to a CAN bus of the VUT and the at least one processing device; and
- the at least one processing device is adapted to record controls signals received via the VUT interface.

16. The test system of claim 15, wherein the at least one processing device is communicatively coupled to the camera and wherein the at least one processing device is adapted to record, via the camera, the HMI outputs responsive to the first set of test cases and the HMI outputs responsive to the second set of test cases.

17. The test system of claim 15 further comprising a microphone, wherein the at least one processing device is communicatively coupled to the microphone, and wherein the at least one processing device is adapted to record, via the microphone, the HMI outputs responsive to the first set of test cases and the HMI outputs responsive to the second set of test cases.

18. The test system of claim 15 further comprising at least one robotic arm, wherein the robotic arm is adapted to perform touch inputs on the HMI in accordance with the generated second set of test cases.

19. The test system of claim 15, wherein each of the assigned scores is indicative of whether the HMI has passed, failed, or is flagged for user review for the first set of test cases and wherein the second set of test cases is inferred from the first set of test cases using a machine learning algorithm.

20. The test system of claim 15 wherein the at least one processing device is further adapted to display the assigned scores by the test system, wherein the assigned scores includes identification of at least one HMI screen anomaly of the HMI outputs responsive to the performed second set of test cases, wherein a request for clarification is generated to a user for user indication of whether one or more areas of the at least one HMI screen anomaly are acceptable, wherein user indication of the one or more areas of the at least one HMI screen anomaly as acceptable includes selecting at least one area of the at least one HMI screen to indicate acceptable area of deviation, and wherein the assigned scores are generated based on the user indication.

* * * * *